(12) United States Patent
Sillard et al.

(10) Patent No.: US 6,574,407 B2
(45) Date of Patent: Jun. 3, 2003

(54) CHROMATIC DISPERSION COMPENSATION IN AN OPTICAL FIBER TRANSMISSION SYSTEM, AND A COMPENSATION FIBER

(75) Inventors: Pierre Sillard, Le Chesnay (FR); Maxime Gorlier, Paris (FR); Louis-Anne de Montmorillon, Paris (FR); Ludovic Fleury, Bois D'Arcy (FR); Florent Beaumont, Conflans Ste Honorine (FR); Pascale Nouchi, Maisons Laffitte (FR)

(73) Assignee: Alcatel, Paris (FR)

( * ) Notice: Subject to any disclaimer, the term of this patent is extended or adjusted under 35 U.S.C. 154(b) by 58 days.

(21) Appl. No.: 09/975,959

(22) Filed: Oct. 15, 2001

(65) Prior Publication Data

US 2002/0076185 A1 Jun. 20, 2002

(30) Foreign Application Priority Data

Oct. 16, 2000 (FR) .............................. 00 13209
May 11, 2001 (FR) .............................. 01 06246

(51) Int. Cl.$^7$ .............................. G02B 6/02; G02B 6/16
(52) U.S. Cl. ...................................... 385/123; 359/173
(58) Field of Search ........................... 385/123; 359/173

(56) References Cited

U.S. PATENT DOCUMENTS

| | | | |
|---|---|---|---|
| 5,224,183 A | * 6/1993 | Dugan | 385/24 |
| 5,448,674 A | * 9/1995 | Vengsarkar et al. | 385/123 |
| 5,781,673 A | * 7/1998 | Reed et al. | 385/24 |
| 5,838,867 A | * 11/1998 | Onishi et al. | 385/123 |
| 5,854,871 A | * 12/1998 | Akasaka | 385/123 |
| 6,430,346 B1 | * 8/2002 | Conradi et al. | 385/123 |

OTHER PUBLICATIONS

Nouchi, P.; Maximum effective area for non–zero dispersion–shifted fiber; Optical Fiber Communication Conference and Exhibit, 1998. OFC '98., Technical Digest, Feb. 22–27, 1998.*

* cited by examiner

Primary Examiner—Brian Healy
Assistant Examiner—Daniel J Petkovsek
(74) Attorney, Agent, or Firm—Sughrue Mion, PLLC

(57) ABSTRACT

The invention proposes providing an optical fiber transmission system with a dispersion compensating fiber $12_l$ to $12_n$ to compensate the chromatic dispersion and chromatic dispersion slope of the line fiber $6_l$ to $6_n$; the dispersion compensating fiber satisfies the following criteria:

$$\frac{C_g}{C'_g} \times \frac{1}{1 + C_{cum}/(L_g \cdot C'_g \cdot \Delta\lambda)} \le \frac{C}{C'} \le \frac{C_g}{C'_g} \times \frac{1}{1 - C_{cum}/(L_g \cdot C'_g \cdot \Delta\lambda)} \quad (1)$$

$$\left|\frac{C'}{C''}\right| \ge \text{Max}\left(\frac{\Delta\lambda}{2} \times \left(\frac{C \cdot C'_g}{C' \cdot C_g} \times \left(1 \pm \frac{C_{cum}}{L_g \cdot C'_g \cdot \Delta\lambda}\right) - 1\right)^{-1}\right) \quad (2)$$

where C, C' et C" are the chromatic dispersion, the chromatic dispersion slope and the first derivative of the chromatic dispersion slope of the dispersion compensating fiber, $C_g$ and $C'_g$ are the chromatic dispersion and the chromatic dispersion slope of the line fiber, $C_{cum}$ is the upper limit of the modulus of the cumulative chromatic dispersion in the transmission system, $L_g$ is the length of a line fiber section, and $\Delta\lambda$ is half the bandwidth of the transmission system.

The invention also proposes optical fibers verifying the above criteria and suitable for compensating the chromatic dispersion of step index or dispersion shifted line fiber.

The proposed criteria compensate chromatic dispersion and chromatic dispersion slope in wideband transmission systems, e.g. in C band and L band transmission systems, for wavelengths from 1530 to 1620 nm.

41 Claims, 1 Drawing Sheet

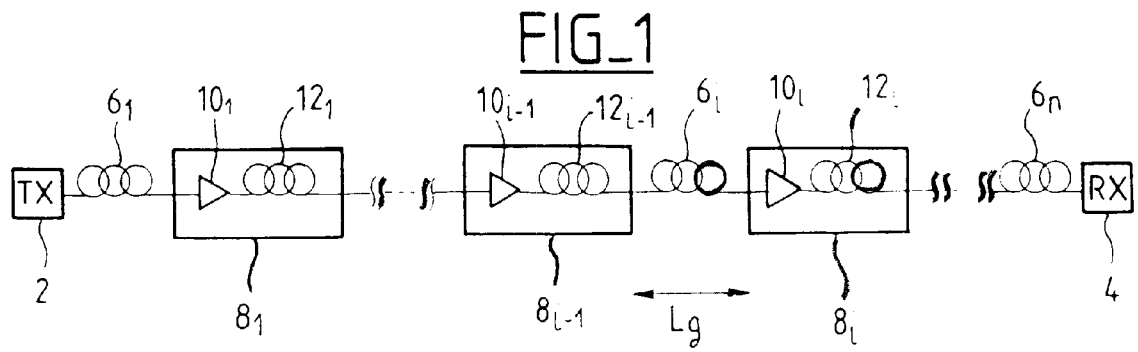
FIG_1
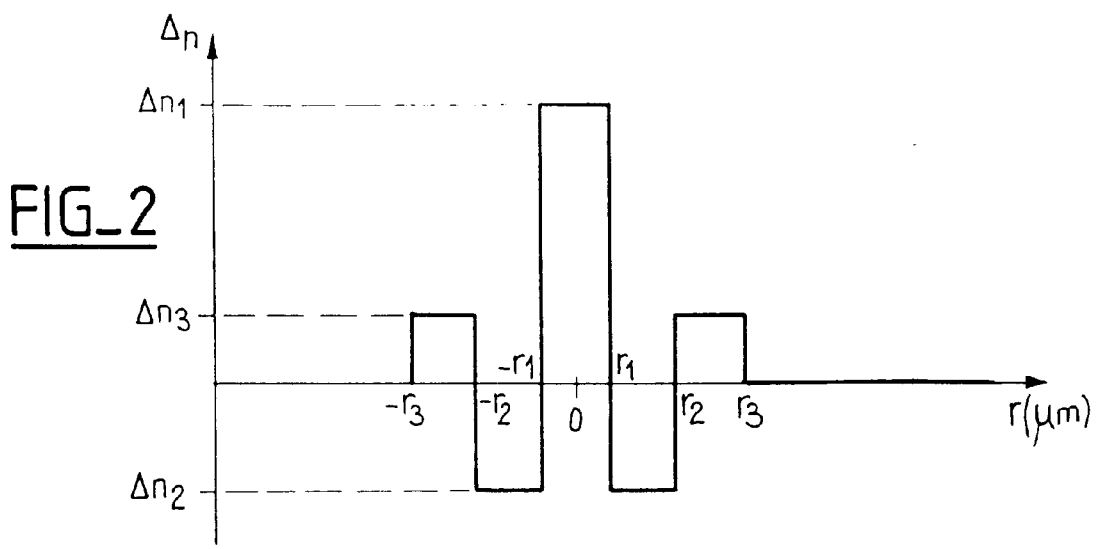
FIG_2
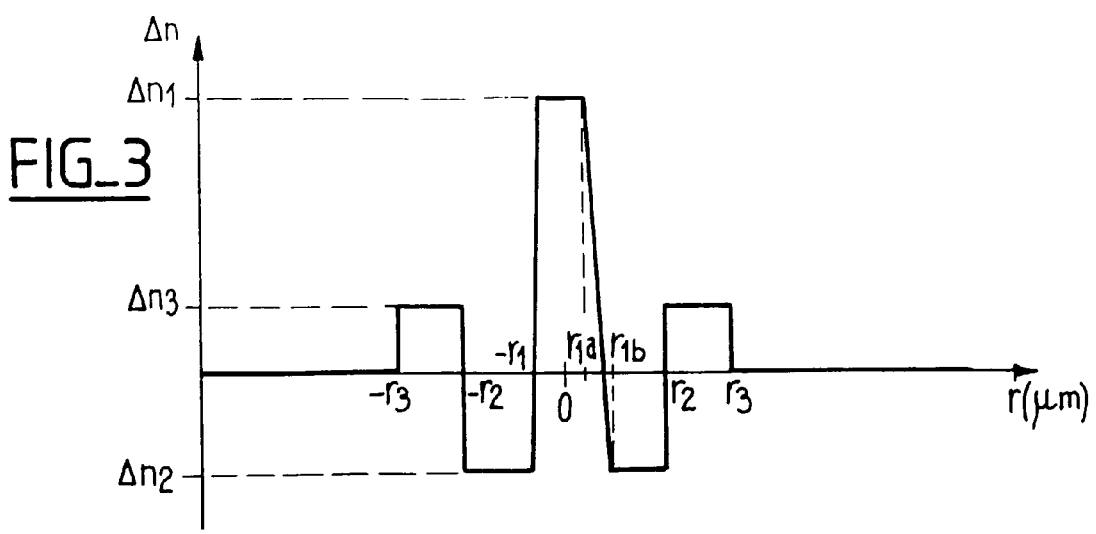
FIG_3

CHROMATIC DISPERSION COMPENSATION IN AN OPTICAL FIBER TRANSMISSION SYSTEM, AND A COMPENSATION FIBER

The present invention relates to optical fiber transmission and more specifically to compensating chromatic dispersion and chromatic dispersion slope in optical fiber transmission systems.

BACKGROUND OF THE INVENTION

The index profile of optical fibers is generally described by the shape of the graph of the function that associates the refractive index of the fiber with its radius. It is conventional to plot the distance $r$ from the center of the fiber on the abscissa axis and the difference between the refractive index and the refractive index of the cladding of the fiber on the ordinate axis. The expressions "step" index profile, "trapezium" index profile, and "triangle" index profile are therefore used with reference to graphs that are respectively step-shaped, trapezium-shaped and triangular. These curves are generally representative of the theoretical or ideal profile of the fiber and fiber fabrication constraints can yield a perceptibly different profile.

It is advantageous to manage chromatic dispersion in new high bit rate wavelength division multiplexed (WDM) transmission networks, especially for bit rates greater than or equal to 40 Gbit/s or 160 Gbit/s; the objective, in order to limit pulse widening, is to obtain substantially zero cumulative chromatic dispersion over the link, for all wavelengths of the multiplex. A cumulative dispersion value of a few tens of ps/nm is generally acceptable. In the vicinity of wavelengths used in the system, it is also beneficial to avoid zero values of the local chromatic dispersion, for which the non-linear effects are strongest. Furthermore, it is also beneficial to limit the cumulative chromatic dispersion slope over the range of the multiplex to prevent or limit distortion between multiplex channels. The chromatic dispersion slope is conventionally the derivative of chromatic dispersion with respect to wavelength.

Step index fibers, also known as single mode fibers (SMF), are conventionally used as line fibers in optical fiber transmission systems. The applicant's ASMF 200 step index monomode fiber has a chromatic dispersion cancellation wavelength $\lambda_0$ from 1300 to 1320 nm and a chromatic dispersion less than or equal to 3.5 ps/(nm.km) in a range from 1285 to 1330 nm and of the order of 17 ps/(nm.km) at 1550 nm. The chromatic dispersion slope at 1550 nm is of the order of 0.06 ps/(nm$^2$.km).

Dispersion shifted fibers (DSF) have also become available. At the transmission wavelength at which they are used, which is generally different from the wavelength of 1.3 μm for which the dispersion of silica is substantially zero, the chromatic dispersion is substantially zero; in other words, the non-zero chromatic dispersion of the silica is compensated—whence the use of the term "shifted"—by increasing the index difference Δn between the core of the fiber and the optical cladding. The index difference causes the wavelength at which zero chromatic dispersion is obtained to be offset; it is achieved by introducing dopants into the preform, during fabrication, for example by a modified chemical vapor deposition (MCVD) process known in the art, and which is not described in more detail here.

Non-zero dispersion shifted fibers (NZ-DSF+) are dispersion shifted fibers having positive non-zero chromatic dispersion at the wavelengths at which they are used, typically around 1550 nm. At these wavelengths these fibers have a low chromatic dispersion, typically less than 11 ps/(nm.km) and a chromatic dispersion slope from 0.04 to 0.1 ps/(nm$^2$.km) at 1550 nm.

The document FR-A2 790 107 proposes a line fiber especially suitable for dense wavelength division multiplex (DWDM) transmission with a channel spacing of 100 GHz or less for a bit rate per channel of 10 Gbit/s; at a wavelength of 1550 nm, this fiber has an effective surface area greater than or equal to 60 μm$^2$, a chromatic dispersion from 6 to 10 ps/(nm.km), and a chromatic dispersion slope less than 0.07 ps/(nm$^2$.km).

French patent application number 00/02316 filed Feb. 24, 2000 whose title in translation is "An optical fiber exhibiting monomode behavior in-cable for wavelength division multiplex optical fiber transmission networks", proposes a line fiber which has, at a wavelength of 1550 nm, a chromatic dispersion from 5 to 11 ps/(nm.km), a ratio of chromatic dispersion to chromatic dispersion slope from 250 to 370 nm, and a ratio of the square of the effective surface area to the chromatic dispersion slope greater than 8×10$^4$ μm$^2$.nm$^2$ km/ps. That line fiber has a range of use from 1300 to 1625 nm. In one example described in the above application, its dispersion is compensated by dispersion compensating fiber having a chromatic dispersion of −100 ps/(nm.km) and a ratio of chromatic dispersion to chromatic dispersion slope of 260 nm.

Using short lengths of dispersion compensating fiber (DCF) to compensate chromatic dispersion and chromatic dispersion slope in SMF or NZ-DSF+ used as line fiber is known in the art. One example of a transmission system in which chromatic dispersion in a SMF line fiber is compensated using DCF is described in M. Nishimura et al., "Dispersion compensating fibers and their applications", OFC'96 Technical Digest ThA1. Such use of dispersion compensating fiber is also mentioned in L. Grüner-Nielsen et al., "Large volume Manufacturing of dispersion compensating fibers", OFC'98 Technical Digest TuD5. The above articles, and other prior art documents, propose choosing the dispersion compensating fiber as a function of the line fiber so that the ratios of chromatic dispersion to chromatic dispersion slope of the compensating fiber and the line fiber are substantially equal.

DCF are also described in various patents. In the vicinity of a wavelength of 1550 nm they have a negative chromatic dispersion to compensate the cumulative chromatic dispersion in the line fiber, and can also have a negative chromatic dispersion slope to compensate the positive chromatic dispersion slope of the line fiber. The documents U.S. Pat. No. 5,568,583 and U.S. Pat. No. 5,361,319 propose a DCF for compensating chromatic dispersion in a SMF which has a dispersion of the order of 17 ps/(nm.km).

The document WO-A-99 13366 proposes a dispersion compensating fiber that it is intended to be used in compensation modules to compensate the chromatic dispersion and the chromatic dispersion slope of a Lucent "True Wave" fiber; the fiber has a chromatic dispersion from 1.5 to 4 ps/(nm.km) and a chromatic dispersion slope of 0.07 ps/(nm$^2$.km). One embodiment of the proposed dispersion compensating fiber has a chromatic dispersion of −27 ps/(nm.km) and a chromatic dispersion slope of −1.25 ps/(nm$^2$.km).

The above dispersion compensating fibers are suitable for transmission systems operating in the C band, i.e. from 1530 to 1565 nm, or around 1550 nm. They are not suitable for compensating chromatic dispersion and chromatic dispersion slope in transmission systems operating in the C and L bands at the same time. In this context, the term "L band" refers to a range of wavelengths above the C band, up to wavelengths of the order of 1610 or 1620 nm. A transmission system in the C and L bands therefore typically uses wavelengths from 1530 to 1610 nm.

A French patent application filed Oct. 26, 2000 by the applicant, whose title in translation is "An optical fiber for in-line compensation of chromatic dispersion of a positive chromatic dispersion optical fiber", describes an optical fiber that is used to compensate chromatic dispersion and chromatic dispersion slope in C, S and/or L band transmission systems, but for chromatic dispersions from −12 ps/nm-km to −4 ps/nm-km.

OBJECTS AND SUMMARY OF THE INVENTION

The invention proposes a new fiber that can in particular be used to compensate chromatic dispersion in a C and L band transmission system. It is suitable for all SMF and for all NZ-DSF line fibers. The invention further proposes a new criterion for optimizing dispersion compensating fibers relative to line fibers, to ensure good compensation of dispersion and dispersion slope in both the C and L bands.

To be more precise, the invention proposes an optical fiber transmission system having a line fiber section and a compensation fiber section for compensating chromatic dispersion in the line fiber section, in which system the chromatic dispersion C and the chromatic dispersion slope C' of the dispersion compensating fiber satisfy the following condition for a wavelength from the range of wavelengths used in the transmission system:

$$\frac{C_g}{C'_g} \times \frac{1}{1 + C_{cum}/(L_g \cdot C'_g \cdot \Delta\lambda)} \leq \frac{C}{C'} \leq \frac{C_g}{C'_g} \times \frac{1}{1 - C_{cum}/(L_g \cdot C'_g \cdot \Delta\lambda)} \quad (1)$$

where $C_g$ is the chromatic dispersion of the line fiber, $C'_g$ is the derivative of the chromatic dispersion of the line fiber with respect to wavelength, $C_{cum}$ is the upper limit of the modulus of the cumulative chromatic dispersion permitted in the line fiber section, and $\Delta\lambda$ is half the width of the range of wavelengths used in the transmission system, and in which system the chromatic dispersion slope C' and the first derivative C" of that slope with respect to wavelength of the dispersion compensating fiber satisfy the following condition for a wavelength substantially in the middle of the range of wavelengths used in the transmission system:

$$\left|\frac{C'}{C''}\right| \geq \text{Max}\left(\frac{\Delta\lambda}{2} \times \left(\frac{C \cdot C'_g}{C' \cdot C_g} \times \left(1 \pm \frac{C_{cum}}{L_g \cdot C'_g \cdot \Delta\lambda}\right) - 1\right)^{-1}\right) \quad (2)$$

The constraints (1) and (2) are advantageously satisfied for a wavelength substantially in the middle of the range of wavelengths used in the transmission system; in this case, the modulus of the difference between said substantially middle wavelength and the middle wavelength of the range of wavelengths used in the transmission system preferably differs by less than 10% from the range of wavelengths used in the transmission system.

The dispersion compensating fiber can have one or more of the following propagation characteristics:
a chromatic dispersion less than −40 ps/(nm.km), or even less than −45 ps/(nm.km), at 1550 nm;
bending losses less than or equal to 400 dB/m, or even less than or equal to 100 dB/m, when wound around a 10 mm radius former, and throughout the range of wavelengths used in the transmission system;
an effective surface area greater than or equal to 12 μm² at 1550 nm;
a polarization mode dispersion less than or equal to 0.5 ps/km$^{1/2}$ at 1550 nm;
an attenuation less than 1 dB/km, or even 0.8 dB/km, at 1550 nm;

The ratio between the upper limit of the modulus of the cumulative chromatic dispersion $C_{cum}$ and the length $L_g$ of a line fiber section is advantageously less than 0.5 ps/(nm.km), or even 0.1 ps/(nm.km).

The line fiber can be a step index fiber or a dispersion shifted fiber with positive chromatic dispersion.

The dispersion compensating fiber preferably has a rectangle with buried trench and ring index profile or a trapezium with buried trench and ring index profile.

The invention also proposes an optical fiber having a chromatic dispersion C less than −40 ps/(nm.km), or even less than −45 ps/(nm.km), at 1550 nm, a chromatic dispersion slope C' and a first derivative C" of chromatic dispersion slope with respect to wavelength satisfying the conditions:

$$a \times \frac{1}{1+b} \leq \frac{C}{C'} \leq a \times \frac{1}{1-b}$$

and $$\left|\frac{C'}{C''}\right| \geq \text{Max}\left(c \times \left(\frac{C}{C'}\frac{1}{a} \times (1 \pm b) - 1\right)^{-1}\right)$$

for a wavelength in the vicinity of 1570 nm, where a, b and c are parameters satisfying the conditions:
280 ≤ a ≤ 360 nm,
0.2 ≤ b ≤ 0.25, and
c ≤ 25 nm.

This fiber can have the propagation characteristics indicated above for the dispersion compensating fiber. It can have a rectangle with buried trench and ring index profile or a trapezium with buried trench and ring index profile.

The index profile can then have one or more of the following characteristics:
the difference ($\Delta n_2$) between the index of the rectangle or the trapezium and index of the cladding is from $18 \times 10^{-3}$ to $30 \times 10^{-3}$ and the radius ($r_1$) of the part of the fiber having an index higher than the cladding is from 1.2 to 2.1 μm;
the difference ($\Delta n_2$) between the index of the depleted trench and the index of the cladding is from $-8.5 \times 10^{-3}$ to $-4.5 \times 10^{-3}$ and the outside radius ($r_2$) of said trench is from 3.4 to 6.1 μm;
the difference ($\Delta n_3$) between the index of the ring and the index of the cladding is from $1 \times 10^{-3}$ to $15 \times 10^{-3}$ and the outside radius ($r_3$) of said ring is from 5.9 to 8 μm;
twice the integral of the product of the radius and the index between a zero radius and the outside radius ($r_1$) of the central part of the fiber having an index higher than the cladding is from $48 \times 10^{-3}$ to $65 \times 10^{-3}$ μm²;
three times the integral of the product of the square of the radius and the index between a zero radius and the outside radius ($r_1$) of the central part of the fiber having an index higher than the cladding is greater than $110 \times 10^{-3}$ μm³;
twice the integral of the product of the radius and the index between the outside radius ($r_1$) of the central part of the fiber having an index higher than the cladding and the inside radius ($r_2$) of the ring is from $-155\times10^{-3}$ to $-75\times10^{-3}$ µm²;

twice the integral of the product of the radius and the index between the inside radius ($r_2$) and the outside radius ($r_3$) of the ring is from $70\times10^{-3}$ to $210\times10$ µm²;

twice the integral of the product of the radius and the index between a zero radius and the outside radius ($r_3$) of the ring is greater than $20\times10^{-3}$ µm².

The invention further proposes an optical fiber having a chromatic dispersion C less than −40 ps/(nm.km), or even less than −45 ps/(nm.km), at 1550 nm, a chromatic dispersion slope C' and a first derivative C" of chromatic dispersion slope with respect to wavelength satisfying the conditions:

$$a \times \frac{1}{1+b} \leq \frac{C}{C'} \leq a \times \frac{1}{1-b}$$

and $$\left|\frac{C'}{C''}\right| \geq \text{Max}\left(c \times \left(\frac{C}{C'}\frac{1}{a} \times (1 \pm b) - 1\right)^{-1}\right)$$

for a wavelength in the vicinity of 1570 nm, where $a$, $b$ and $c$ are parameters verifying the conditions:

120≦a≦200 nm, 0.2≦b≦0.25, and c≦25 nm.

This fiber can have the propagation characteristics indicated above for the dispersion compensating fiber. It can have a rectangle with buried trench and ring index profile or a trapezium with buried trench and ring index profile.

The index profile can then have one or more of the following characteristics:

the difference ($\Delta n_1$) between the index of the rectangle or the trapezium and the index of the cladding is from $18\times10^{-3}$ to $30\times10^{-3}$ and the radius ($r_1$) of the part of the fiber having an index higher than the cladding is from 1.2 to 1.9 µm;

the difference ($\Delta n_2$) between the index of the depleted trench and the index of the cladding is from $-10\times10^{-3}$ to $-5.8\times10^{-3}$ and the outside radius ($r_2$) of said trench is from 3.4 to 6.1 µm;

the difference ($\Delta n_3$) between the index of the ring and the index of the cladding is from $1\times10^{-3}$ to $17.5\times10^{-3}$ and the outside radius ($r_3$) of said ring is from 6.25 to 8.3 µm;

twice the integral of the product of the radius and the index between a zero radius and the outside radius ($r_1$) of the central part of the fiber having an index higher than the cladding is from $50\times10^{-3}$ to $60\times10^{-3}$ µm²;

twice the integral of the product of the radius and the index between a zero radius and the outside radius ($r_1$) of the central part of the fiber having an index higher than the cladding is from $50\times10^{-3}$ to $60\times10^{-3}$ µm²;

three times the integral of the product of the square of the radius and the index between a zero radius and the outside radius ($r_1$) of the central part of the fiber having an index higher than the cladding is less than $110\times10^{-3}$ µm³;

twice the integral of the product of the radius and the index between the outside radius ($r_1$) of the central part of the fiber having an index higher than the cladding and the inside radius ($r_2$) of the ring is from $-230\times10$ to $-145\times10^{-3}$ µm²;

twice the integral of the product of the radius and the index between the inside radius ($r_1$) and the outside radius ($r_3$) of the ring is from $-180\times10^{-3}$ to $-260\times10$ µm²;

twice the integral of the product of the radius and the index between a zero radius and the outside radius ($r_3$) of the ring is from $20\times10^{-3}$ µm² to $145\times10^{-3}$ µm².

BRIEF DESCRIPTION OF THE DRAWINGS

Other features and advantages of the invention will become apparent on reading the following description of embodiments of the invention, which description is given by way of example and with reference to the accompanying drawings, in which:

FIG. 1 is a diagrammatic representation of a transmission system in accordance with the invention;

FIG. 2 is a diagrammatic representation of a set point index profile of a first embodiment of a fiber in accordance with the invention, and FIG. 3 is a diagrammatic representation of a set point index profile of a second embodiment of a fiber in accordance with the invention

MORE DETAILED DESCRIPTION

The invention is based on the observation that the criterion used in the prior art for choosing dispersion compensating fibers is not necessarily suited to transmission systems operating in ranges of wavelengths beyond the C band. In particular, the criterion of equal ratios of chromatic dispersion to chromatic dispersion slope for the line fiber and the dispersion compensating fiber is not the optimum for transmission systems operating in both the C band and the L band.

One possible explanation of this phenomenon resides in the interdependence of chromatic dispersion and wavelength; it is found that chromatic dispersion is a substantially linear function of wavelength for the line fiber, and this applies even outside the C band. On the other hand, chromatic dispersion is not necessarily a linear function of wavelength for the dispersion compensating fiber outside the C band.

One embodiment of the invention therefore proposes new criteria which effectively qualify the dispersion compensation in a transmission system; these criteria can be used, independently or in combination, to verify the effectiveness of dispersion compensation in a transmission system; they can also be used, as explained below, to select fibers to be used as dispersion compensating fibers in transmission systems. The criteria take account not only of line fiber chromatic dispersion and chromatic dispersion slope, but also of the first derivative of chromatic dispersion slope and the length of the line fiber sections.

FIG. 1 is a diagrammatic representation of one embodiment of a wavelength division multiplex transmission system in accordance with the invention. FIG. 1 shows the transmitter TX 2 and the receiver RX 4 of the transmission system with the line fiber between them. The line fiber is made up of sections 61 to 6, separated by repeaters $8_i$ to $8_{n-i}$; each repeater $8_i$ includes an amplifier $10_i$ whose structure has no effect on the working of the invention and is therefore not described. There is a section $12_i$ of dispersion compensating fiber at the output of the amplifier. Placing the dispersion compensating fiber downstream of the amplifier limits the effects of strong attenuation in the fiber. Hereinafter, $L_g$ denotes the length of the line fiber between two sections of dispersion compensating fiber; in the example shown in the figure, that length corresponds to the distance between two repeaters.

In the FIG. 1 example, a section of dispersion compensating fiber is provided in each repeater; it is also possible to provide the dispersion compensating fiber only in some repeaters, and not in each repeater; for example, one in N repeaters could be provided with dispersion compensating fiber, where N is an integer greater than or equal to 2. In this case, the expression "length of the line fiber section" would refer to the length of the line fiber between two repeaters including the dispersion compensating fibers. Other modifications to the FIG. 1 transmission system are possible: thus filters, an amplifier downstream of the dispersion compensating fiber, etc. can be provided.

The proposed criteria define, for the dispersion compensating fiber, limits for the ratio C/C' of chromatic dispersion to chromatic dispersion slope and for the ratio C'/C" of chromatic dispersion slope to the first derivative of chromatic dispersion slope. Thus the following condition is imposed:

$$\frac{C_g}{C'_g} \times \frac{1}{1 + C_{cum}/(L_g \cdot C'_g \cdot \Delta\lambda)} \le \frac{C}{C'} \le \frac{C_g}{C'_g} \times \frac{1}{1 - C_{cum}/(L_g \cdot C'_g \cdot \Delta\lambda)} \quad (1)$$

In the above condition, C and C' represent the chromatic dispersion and the chromatic dispersion slope of the dispersion compensating fiber, respectively expressed in ps/(nm.km) and in ps/(nm².km). $C_g$ and $C'_g$ represent the chromatic dispersion and the chromatic dispersion slope of the line fiber, in the same units. $C_{cum}$ is the upper limit of the modulus of the cumulative chromatic dispersion in the transmission system, in ps/nm; the cumulative chromatic dispersion is the integral of the chromatic dispersion with respect to length over the entire length of the transmission system; macroscopically, the cumulative chromatic dispersion for a line fiber section and a dispersion compensating fiber section is equal to the sum of the product of the chromatic dispersion of the line fiber and the length of the section of line fiber and the product of the chromatic dispersion of the compensating fiber and the length of the section of compensating fiber. The cumulative chromatic dispersion is calculated for a given wavelength; the quantity $C_{cum}$ is the maximum of the modulus of the cumulative chromatic dispersion for the wavelengths used in the transmission system. $L_g$ is the length of a section of line fiber and $\Delta\lambda$ is half the bandwidth of the transmission system.

Condition (1) amounts to limiting the ratio C/C' rather than just the chromatic dispersion, as in the prior art. Also, condition (1) involves the cumulative chromatic dispersion and the bandwidth of the system. Condition (1) is a necessary but not sufficient condition for the cumulative chromatic dispersion in the system to remain below the upper limit of the modulus of the cumulative chromatic dispersion $C_{cum}$ permitted throughout the range of wavelengths used in the system.

Condition (1) is preferably satisfied for a wavelength close to the median wavelength used in the system. The condition may be satisfied for another wavelength.

In addition to the constraint (1), a constraint is imposed on the modulus of the ratio of chromatic dispersion slope to the first derivative of chromatic dispersion slope, to obtain a necessary and sufficient condition for the modulus of the cumulative chromatic dispersion in the system to remain below the permitted upper limit $C_{cum}$ of chromatic dispersion throughout the range of wavelengths used in the system.

This second constraint is written:

$$\left|\frac{C'}{C''}\right| \ge \text{Max}\left(\frac{\Delta\lambda}{2} \times \left(\frac{C \cdot C'_g}{C' \cdot C_g}\right) \times \left(1 \pm \frac{C_{cum}}{L_g \cdot C'_g \cdot \Delta\lambda}\right) - 1\right)^{-1}\right) \quad (2)$$

In this condition, the notation is the same as above. The function Max(x, y) is that which associates with two real numbers x and y the greater of the two real numbers. In condition (2), the function Max is applied to the two values of the ratio calculated for the two possible values of the symbol "±".

Condition (2) therefore yields a lower limit on the modulus of the ratio of the chromatic dispersion slope to the first derivative of the chromatic dispersion slope. The condition is verified at or in the vicinity of the center of the range of wavelengths concerned. For transmission in the C and L bands, the conditions are calculated in the vicinity of 1570 nm; that value is chosen because the cumulative chromatic dispersion of the combination of the line fiber and the dispersion compensating fiber in those bands is substantially symmetrical about 1570 nm. It is therefore at this wavelength that the dispersion is best approximated by a parabola, and condition (2) gives the best approximation. Moving away from that value, the value of the lower limit varies. In practice, it is found that, to obtain the same results in terms of dispersion compensation, a variation of ±10 nm relative to the center of the range of wavelengths entails doubling the lower limit, i.e. multiplying by 2 the right-hand term in condition (2). It is sufficient in practice for condition (2) to be satisfied for a wavelength whose difference relative to the median wavelength of the transmission system is less than 10% of the width of the range.

It will be noted that conditions (1) and (2) are calculated locally, as a function of the length of line fiber to be compensated. The criteria can therefore be calculated locally, i.e. in the vicinity of a repeater or a section of line fiber. In this case, the upper limit $C_{cum}$ therefore imposes a limit on the modulus of the cumulative chromatic dispersion in the preceding section of line fiber. On the other hand, the constraints can also be calculated globally, and in this case the upper limit $C_{cum}$ is a constraint on the modulus of the cumulative chromatic dispersion over the whole of the transmission system; that constraint is satisfied over all the sections of line fiber. The local calculation and the global calculation have the same effect if the transmission system has a periodic structure, of course. It will further be noted that the value of $C_{cum}$ can vary as a function of the length of a line fiber section; thus the example given below concerns a value for $C_{cum}$ of 50 ps/nm for a line fiber section length of 100 km. A value $C_{cum}$ of 100 ps/nm could also be imposed for 200 km line fiber sections; on average, the cumulative chromatic dispersion in the transmission system would then remain the same; all that would vary would be the absolute value reached over a section of line fiber. More generally, a value of the ratio $C_{cum}/L_g$ less than or equal to 0.5 ps/(nm.km) is suitable; a value of 0.1 ps/(nm.km) is even more advantageous for very high bit rate wavelength division multiplex transmission systems.

Compared to the prior art, condition (1) gives a permitted range of error for the notionally equal values of the ratios C/C' and $C_g/C'_g$. Condition (2), which is additive with condition (1), imposes a constraint on the absolute value of the ratio C'/C". These conditions take into account the bandwidth of the transmission system.

The two conditions ensure that the dispersion compensating fiber effectively compensates chromatic dispersion and chromatic dispersion slope over the whole width of the range of wavelengths used in the transmission system; to be more specific, the system then has a cumulative chromatic dispersion with an absolute value less than $C_{cum}$ over the whole transmission bandwidth $2.\Delta\lambda$.

Over and above the first condition or both conditions, it is advantageous for the dispersion compensating fiber to have one or more of the following characteristics:

bending losses less than 400 dB/m, and preferably less than 100 dB/m, for a wavelength from 1530 to 1620 nm, when the fiber is wound onto a 10 mm radius former;

bending losses less than 0.05 dB, and preferably less than $10^{-3}$ dB, for a wavelength from 1530 to 1620 nm, for 100 turns wound onto a 30 mm radius former;

a ratio of chromatic dispersion to attenuation less than or equal to −100 ps/(nm.dB) for a wavelength from 1530 to 1620 nm;

an effective surface area greater than or equal to 12 $\mu m^2$, and preferably greater than or equal to 15 $\mu m^2$, or even 20 $\mu m^2$, for a wavelength of 1550 nm;

a chromatic dispersion less than or equal to −40 ps/(nm.km), and preferably less than or equal to −50 ps/(nm.km), for a wavelength of 1550 nm;

a sensitivity to microbendings less than or equal to 1, and preferably less than or equal to 0.5, for a wavelength of 1550 nm;

a difference between the index at any point in the fiber and the index of the cladding less than or equal to $30 \times 10^{-3}$;

a polarization mode dispersion less than or equal to 0.5 ps/km$^{1/2}$ for a wavelength of 1550 nm; and an attenuation less than 1 dB/km, and preferably 0.8 dB/km, for a wavelength of 1550 nm.

The value of the chromatic dispersion limits the length of the dispersion compensating fiber and therefore attenuation in that fiber; the limit on the bending losses in particular allows the dispersion compensating fiber to be coiled in the repeaters. These constraints are preferably complied with throughout the range of wavelengths used in the transmission system. The constraint on the effective surface area limits non-linear effects in the dispersion compensating fiber; this constraint is advantageously satisfied in the vicinity of 1550 nm. The fiber advantageously has a polarization mode dispersion less than or equal to 0.5 ps/km$^{1/2}$ in the vicinity of a wavelength of 1550 nm; this polarization mode dispersion value ensures good transmission at high bit rates. The fiber can also have an attenuation less than 1 dB/km, or even less than 0.8 dB/km, in the vicinity of a wavelength of 1550 nm; these attenuation values limit losses in the compensation fiber.

Examples are described next of transmission systems respectively using as line fiber step index fiber and positive dispersion shifted fiber.

Step Index Fiber

In the step index fiber example, the fiber has the following characteristics:

chromatic dispersion at 1570 nm: 18.5 ps/(nm.km);

chromatic dispersion slope at 1570 nm: 0.058 ps/(nm.km);

in-cable cut-off wavelength less than 1300 nm;

effective surface area at 1570 nm: 81 $\mu m^2$.

This kind of fiber can have a difference between the index of the core and the index of the cladding of the order of $5 \times 10^{-3}$ and a core radius of the order of 4.5 $\mu m$. For this kind of line fiber, a transmission system in the C and L bands from 1530 to 1610 nm, a line fiber section length of 100 km and a cumulative chromatic dispersion less than 50 ps/nm, conditions (1) and (2) above yield,:

$$260 \text{ nm} \leq C/C' \leq 400 \text{ nm} \quad (3)$$

and $$\left|\frac{C'}{C''}\right| \geq \text{Max}\left(20 \times \left(\frac{C}{C'} \frac{1}{320} \times (1 \pm 0.22) - 1\right)^{-1}\right) \quad (4)$$

The above conditions can be generalized to other types of step index fiber, and are then written:

$$a \times \frac{1}{1+b} \leq \frac{C}{C'} \leq a \times \frac{1}{1-b} \quad (5)$$

and $$\left|\frac{C'}{C''}\right| \geq \text{Max}\left(c \times \left(\frac{C}{C'} \frac{1}{a} \times (1 \pm b) - 1\right)^{-1}\right) \quad (6)$$

In this case, a, b and c are parameters representative of the line fiber and the transmission system that satisfy the following conditions:

280 ≤ a ≤ 360 nm 0.2 ≤ b ≤ 0.25 c ≤ 25 nm.

b is dimensionless, but a and c have the dimension of a wavelength. The parameter a is representative of the ratio C/C' of the line fiber to be compensated. The parameter b is a correction resulting from the application of the previous conditions. The parameter c corresponds to one quarter of the bandwidth concerned; the chosen value of 25 nm is suitable for systems with a bandwidth of less than 100 nm, for example transmission systems in the widened C and L bands. Condition (5) is satisfied for a wavelength used in the transmission system, typically for a wavelength from 1530 to 1610 nm. Condition (6) is satisfied for a wavelength close to the median wavelength used in the transmission system; a wavelength value close to 1570 nm or from 1565 to 1575 nm is suitable.

For fibers having the FIG. 2 or 3 profile, the above criteria can be satisfied by the values set out in the tables below. The FIG. 2 profile is a set point rectangle with buried trench and ring index profile. It has, starting from the center of the fiber:

a central part with a substantially constant index higher than or equal to the index of the cladding; and an annular part of index lower than or equal to the index of the cladding;

the combination constituting a "rectangle with buried or depleted trench" index profile.

The FIG. 2 fiber has a ring around the buried trench, i.e. a part whose index is higher than the index of the cladding, whence the term "rectangle with buried trench and ring" index profile.

Hereinafter, $\Delta n_1$ denotes the different between the index of the central part and the index of the cladding of the fiber, $\Delta n_2$ the difference between the index of the buried trench and the index of the cladding of the fiber, and $\Delta n_3$ the difference between the index of the ring and the index of the cladding of the fiber. As explained above, $\Delta n_1$ and $\Delta n_3$ have a positive value and $\Delta n_2$ has a negative value.

The FIG. 3 index profile is a trapezium with buried trench and ring index profile. The only difference between this profile and that shown in FIG. 2 resides in the fact that the central part is trapezium-shaped and not rectangular, with a minimum radius $r_{1a}$, a maximum radius $r_{1b}$ and a radius $r_1$ corresponding to the radius of the central part at the point where it crosses the abscissa axis. Thus the central part of radius $r_{1a}$ and with a constant index higher than the cladding can be called the "smaller base of the trapezium". The "larger base of the trapezium" corresponds to the radius $r_{1b}$ in the figure, and extends out as far as the inside radius of the buried trench. In the trapezium index profile, $r_1$ denotes the radius of the central part of the fiber which has an index higher than the cladding of the fiber.

Examples of dispersion compensating fibers are given in the table below. The fibers S1 to S4 have a FIG. 2 type profile and the fibers S5 to S8 have a FIG. 3 type profile.

TABLE 1

| | $r_{1a}$ ($\mu$m) | $r_1$ ($\mu$m) | $r_{1b}$ ($\mu$m) | $r_2$ ($\mu$m) | $r_3$ ($\mu$m) | $10^3 \Delta n_1$ | $10^3 \Delta n_2$ | $10^3 \Delta n_3$ |
|---|---|---|---|---|---|---|---|---|
| Fiber S1 | 1.37 | 1.37 | 1.37 | 4.94 | 6.02 | 25.6 | −5.8 | 12.0 |
| Fiber S2 | 1.47 | 1.47 | 1.47 | 4.36 | 7.57 | 23.1 | −5.9 | 2.9 |
| Fiber S3 | 1.53 | 1.53 | 1.53 | 4.79 | 7.84 | 22.5 | −5.0 | 4.1 |
| Fiber S4 | 1.64 | 1.64 | 1.64 | 4.82 | 6.70 | 20.4 | −6.5 | 7.3 |
| Fiber S5 | 1.20 | 1.65 | 1.78 | 4.94 | 7.12 | 23.6 | −6.1 | 6.8 |
| Fiber S6 | 1.20 | 1.78 | 1.93 | 4.49 | 7.25 | 22.5 | −6.0 | 4.8 |
| Fiber S7 | 1.14 | 1.74 | 1.9 | 4.45 | 7.45 | 23.9 | −6.2 | 5.1 |
| Fiber S8 | 1.48 | 1.90 | 2.01 | 5.00 | 7.82 | 18.7 | −4.9 | 5.2 |

The Table 1 fibers satisfy the above criteria (1) and (2) for the SMF concerned and for the values $C_{cum}$, $L_g$ and $\Delta\lambda$ mentioned above. They have the propagation characteristics set out in Table 2 below for a wavelength of 1570 nm.

TABLE 2

| | $\lambda_{cth}$ nm | $2W_{02}$ $\mu$m @1570 | $S_{eff}$ $\mu$m$^2$ @1570 | C p s/nm·km @1570 | C/C' nm @1570 | Fs nm @1570 | \|C'/C"\| nm @1570 | $PC_{1620}$ db/m | $S_{\mu c}$ @1570 |
|---|---|---|---|---|---|---|---|---|---|
| Fiber S1 | 1680 | 4.5 | 16 | −120 | 365 | 229 | >650 | <100 | <0.5 |
| Fiber S2 | 1660 | 4.7 | 17 | −100 | 375 | 320 | >350 | <100 | <0.5 |
| Fiber S3 | 1780 | 4.7 | 17 | −75 | 355 | 178 | >200 | <100 | <0.5 |
| Fiber S4 | 1710 | 4.9 | 19 | −90 | 330 | 114 | >850 | <100 | <0.5 |
| Fiber S5 | 1795 | 4.6 | 17 | −110 | 280 | 260 | >450 | <100 | <0.5 |
| Fiber S6 | 1740 | 4.8 | 18 | −85 | 380 | 400 | >450 | <100 | <0.5 |
| Fiber S7 | 1860 | 4.6 | 17 | −105 | 330 | 114 | >800 | <100 | <0.5 |
| Fiber S8 | 1910 | 5.3 | 22 | −75 | 390 | 800 | >1000 | <100 | <0.5 |

In Table 2, $\lambda_{cth}$ is the theoretical cut-off wavelength of the fiber, expressed in nanometers; in practice, the cut-off wavelength measured in-cable is several nm lower; it is understood that the fiber is effectively a monomode fiber in the range of wavelengths of the wanted signals, in particular in the C and L bands. $2W_{02}$ is the mode diameter in micrometers; $S_{eff}$ is the effective area in square micrometers. C is the chromatic dispersion expressed in ps/(nm.km). C' is the chromatic dispersion slope, i.e. the derivative of chromatic dispersion with respect to wavelength, expressed in ps/(nm$^2$.km); the ratio C/C' of chromatic dispersion to chromatic dispersion slope therefore has the dimension of a wavelength, and is expressed in nanometers. $F_s$ is the lower limit of the modulus of the ratio C'/C", given in condition (4) above. C" is the first derivative of chromatic dispersion slope with respect to wavelength; the table gives the modulus of the ratio C'/C" which has the dimension of a wavelength, and is expressed in nanometers. The fiber advantageously has acceptable bending losses at 1620 nm because this limits the losses throughout the range of use from 1530 to 1620 nm. $PC_{1620}$ represents bending line losses in the fiber, measured at a wavelength of 1620 nm by winding the fiber around a 10 mm diameter spool. Finally, $S_{\mu c}$ is a dimensionless coefficient representing the sensitivity of the fiber to microbendings; in the table, this coefficient is measured relative to the applicant's prior art ASMF 200 cable. This coefficient can be measured by the method known in the art of crushing the fiber between two grids.

The table shows that the Table 1 fibers have propagation characteristics enabling them to be used as dispersion compensating fibers in repeaters or amplifiers of an optical fiber transmission system. The values of C/C' and of the modulus of the ratio C'/C" of the fiber enable it to compensate chromatic dispersion in a SMF.

In all the Table 1 examples, 5% variations of the index $\Delta n_1$ of the central part or of 10% of the indices $\Delta n_2$ and $\Delta n_3$ of the buried trench and the ring yield similar results. Likewise the radii, which can vary by 10% for $r_1$ and $r_2$ and by 5% for $r_3$ relative to the values set out in the Table 1 examples and yield analogous results.

The Table 2 values are given for a wavelength of 1570 nm; at wavelengths from 1550 nm and 1590 nm the fibers have the parameter values set out in Table 3 below.

TABLE 3

| | $S_{eff}$ $\mu$m$^2$ @1550 | C ps/ nm·km @1550 | C/C' nm @1550 | $S_{eff}$ $\mu$m$^2$ @1590 | C ps/ nm·km @1590 | C/C' nm @1590 |
|---|---|---|---|---|---|---|
| Fiber S1 | 15 | −115 | 350 | 17 | −130 | 400 |
| Fiber S2 | 16 | −90 | 355 | 18 | −105 | 380 |
| Fiber S3 | 16 | −75 | 370 | 18 | −85 | 365 |
| Fiber S4 | 18 | −85 | 310 | 21 | −100 | 385 |
| Fiber S5 | 16 | −105 | 275 | 19 | −120 | 300 |
| Fiber S6 | 17 | −85 | 370 | 19 | −95 | 415 |
| Fiber S7 | 15 | −95 | 335 | 17 | −110 | 380 |
| Fiber S8 | 21 | −70 | 365 | 23 | −80 | 435 |

From the profile point of view, the dimensions of the dispersion compensating fiber can be chosen by applying one or more of the conditions set out below; on the one hand, with regard to the rectangle or ring central part, advantageously:

$18 \times 10^{-3} \leq \Delta n_1 \leq 30 \times 10^{-3}$, and $1.2 \leq r_1 \leq 2.1 \,\mu m$.

For the buried trench, index difference $\Delta n_2$ and outside radius $r_2$ values can be chosen to verify:

$8.5 \times 10^{-3} \leq \Delta n_2 \leq -4.5 \times 10^{-3}$, and $3.4 \leq r_2 \leq 6.1 \,\mu m$.

For the ring, the index difference $\Delta n_3$ and outside radius $r_3$ values can be chosen to verify:

$1 \times 10^3 \leq \Delta n_3 \leq 15 \times 10^{-3}$, and $5.9 \leq r_3 \leq 8 \,\mu m$.

Other fiber characterizations are possible. This the parameter $S_1$ can be used, defined by the equation $$S_1 = 2 \cdot \int_0^{r_1} \Delta n(r) \cdot r \cdot dr$$

This parameter is homogeneous to the product of a surface area and an index. It applies simply to the trapezium profile and to the rectangle profile, and is representative of the increased index in the vicinity of the core of the fiber. Its value is preferably from $48 \times 10^{-3}$ to $65 \times 10^{-3} \,\mu m^2$.

The parameter $S_{11}$ defined by the following equation:

$$S_{11} = 3 \cdot \int_0^{r1} \Delta n(r) \cdot r^2 \cdot dr$$

is homogeneous to the product of an index by the square of a surface area. In physical terms, this parameter is representative of the correspondence between a rectangle profile and a trapezium profile in the theory of equivalent fibers. The value of this parameter is preferably less than $110 \times 10^{-3} \,\mu m^3$.

It is also possible to use the parameter $S_2$, defined by the equation:

$$S_2 = 2 \cdot \int_{r1}^{r2} \Delta n(r) \cdot r \cdot dr$$

This parameter is homogeneous to the product of a surface area and an index. It is representative of the reduced index in the buried trench. Its value is preferably from $-155 \times 10^{-3}$ to $-75 \times 10^{-3} \,\mu m^2$.

Similarly, the parameter $S_3$ defined by the following equation:

$$S_3 = 2 \cdot \int_{r2}^{r3} \Delta n(r) \cdot r \cdot dr$$

is homogeneous to the product of a surface area and an index, and is representative of the increased index in the ring. Its value is preferably from $70 \times 10^{-3}$ to $210 \times 10^{-3} \,\mu m^2$.

Another possible parameter is the parameter $S_{123}$, which is defined by the following equation:

$$S_{123} = 2 \cdot \int_0^{r3} \Delta n(r) \cdot r \cdot dr$$

This parameter is representative of the average index increase relative to the index of silica over the whole of the profile. Its value is preferably greater than $20 \times 10^{-3} \,\mu m^2$.

The profile of a fiber which can be used as dispersion compensating fiber with a step index fiber is defined by one of the above parameters or a combination of several of those parameters.

DSF+

The example of a positive dispersion shifted fiber has the following characteristics:

chromatic dispersion at 1570 nm: 9.2 ps/(nm.km);

chromatic dispersion slope at 1570 nm 0.058 ps/(nm².km);

in-cable cut-off wavelength less than 1300 nm;

effective surface area at 1570 nm: 66 $\mu m^2$.

The applicant's TeraLight fiber is a fiber of this kind; it is described in patent application number 99/02028 of Feb. 18, 1999. For this kind of line fiber in a transmission system operating in the C and L bands from 1530 to 1610 nm, the conditions (1) and (2) given above yield, for a line fiber section length of 100 km and a cumulative chromatic dispersion less than 50 ps/nm:

$$130 \text{ nm} \leq C/C' \leq 200 \text{ nm} \tag{7}$$

and $$\left| \frac{C'}{C''} \right| \geq \text{Max}\left( \frac{20}{\frac{C}{C} \frac{1}{160} \times (1 \pm 0.22) - 1} \right) \tag{8}$$

Once again, the above criteria are one specific application of the general conditions (5) and (6) given above; in the case of positive dispersion shifted line fiber, the parameters a, b and c defined above typically satisfy the following conditions:

$120 \leq a \leq 200$ nm $0.2 \leq b \leq 0.25$ $c \leq 25$ nm.

Fibers having the FIG. 2 or FIG. 3 profile satisfy the above criteria for the values set out in the tables below. The notation used for these profiles is the same as used above. Fibers T1 to T4 are rectangle core fibers and fibers T5 and T6 are trapezium core fibers.

TABLE 4

| | $r_{1a}$ ($\mu m$) | $r_1$ ($\mu m$) | $r_{1b}$ ($\mu m$) | $r_2$ ($\mu m$) | $r_3$ ($\mu m$) | $10^3 \Delta n_1$ | $10^3 \Delta n_2$ | $10^3 \Delta n_3$ |
|---|---|---|---|---|---|---|---|---|
| Fiber T1 | 1.44 | 1.44 | 1.44 | 4.88 | 7.70 | 24.2 | −7.2 | 5.3 |
| Fiber T2 | 1.45 | 1.45 | 1.45 | 5.39 | 6.49 | 24.2 | −8.1 | 14.3 |
| Fiber T3 | 1.79 | 1.79 | 1.79 | 6.07 | 7.12 | 18.3 | −6.3 | 17.4 |
| Fiber T4 | 1.78 | 1.78 | 1.78 | 5.78 | 7.41 | 18.5 | −6.9 | 10.9 |
| Fiber T5 | 1.30 | 1.55 | 1.82 | 4.25 | 7.67 | 22.9 | −9.9 | 4.4 |
| Fiber T6 | 1.31 | 1.69 | 1.84 | 4.87 | 6.43 | 23.6 | −9.4 | 10.2 |

The Table 4 fibers satisfy the criteria (1) and (2) stated above for the dispersion shifted fiber concerned and for the values $C_{cum}$, $L_g$ et $\Delta \lambda$ mentioned above. They have the propagation characteristics set out in Table 5 below at a wavelength of 1570 nm.

TABLE 5

|  | $\lambda_{cth}$ nm @1570 | $2W_{02}$ µm @1570 | $S_{eff}$ µm² @1570 | C ps/nm · km @1570 | C/C' Nm @1570 | Ft Nm @1570 | $\|C'/C''\|$ nm @1570 | $PC_{1620}$ dB/m | $S_{\mu c}$ @1570 |
|---|---|---|---|---|---|---|---|---|---|
| Fiber T1 | 1845 | 4.5 | 16 | −135 | 165 | 114 | >150 | <100 | <0.5 |
| Fiber T2 | 1711 | 4.4 | 15 | −135 | 150 | 130 | >150 | >100 | <0.5 |
| Fiber T3 | 2020 | 5.1 | 22 | −85 | 185 | 267 | >500 | <100 | <0.5 |
| Fiber T4 | 2010 | 5.0 | 21 | −90 | 180 | 200 | >200 | <100 | <0.5 |
| Fiber T5 | 1.785 | 4.6 | 17 | −155 | 170 | 133 | >700 | <100 | <0.5 |
| Fiber T6 | 1740 | 4.3 | 15 | −95 | 175 | 160 | >200 | <100 | <0.5 |

The notation used in this table is the same as that used in Table 2 relating to SMF, except that the lower limit of the ratio of the modulus C'/C" is denoted Ft and not Fs and is given by condition (8).

The table shows that the Table 4 fibers have propagation characteristics enabling them to be used as dispersion compensating fiber in a repeater or amplifier of an optical fiber transmission using dispersion shifted fiber as line fiber. The values of C/C' and of the modulus of the ratios C'/C" enable the fiber to compensate cumulative chromatic dispersion in the line fiber.

As in the Table 1 examples, in all the Table 3 examples 5% index variations $\Delta n_1$ of the central part or 10% index variations $\Delta n_2$ and $\Delta n_3$ of the buried trench and the ring yield similar results. Likewise the radii, which can vary by 10% in the case of $r_1$ and $r_2$ and 5% in the case of $r_3$ relative to the values given in the Table 1 examples and yield analogous results.

As previously, Table 6 sets out the propagation parameters for wavelengths of 1550 nm and 1590 nm.

TABLE 6

|  | $S_{eff}$ µm² @1550 | C ps/ nm · km @1550 | C/C' nm @1550 | $S_{eff}$ µm² @1590 | C ps/ nm · km @1590 | C/C' nm @1590 |
|---|---|---|---|---|---|---|
| Fiber T1 | 15 | −120 | 160 | 18 | −150 | 170 |
| Fiber T2 | 14 | −120 | 150 | 17 | −150 | 155 |
| Fiber T3 | 20 | −80 | 175 | 24 | −105 | 215 |
| Fiber T4 | 19 | −82 | 170 | 22 | −111 | 190 |
| Fiber T5 | 16 | −140 | 160 | 19 | −170 | 195 |
| Fiber T6 | 14 | −85 | 175 | 16 | −110 | 175 |

From the point of view of the profile, the dimensions of the dispersion compensating fiber can be chosen by applying one or more of the following conditions; on the one hand, with regard to the rectangle or ring central part, advantageously:

$18 \times 10^{-3} \leq \Delta n_1 \leq 30 \times 10^{-3}$, and $1.2 \leq r_1 \leq 1.9$ µm.

For the buried trench, the index difference $\Delta n_2$ and outside radius $r_2$ values can be chosen to verify:

$-10 \times 10^{-3} \leq \Delta n_2 \leq -5.8 \times 10^{-3}$, and $3.4 \leq r_2 \leq 6.1$ µm.

For the ring, the index difference $\Delta n_3$ and outside radius $r_3$ values can be chosen to verify:

$1 \times 10^{-3} \leq \Delta n_3 \leq 17.5 \times 10^{-3}$, and $6.25 \leq r_3 \leq 8.3$ µm.

The parameters $S_1$, $S_{11}$, $S_2$, $S_3$ and $S_{123}$ defined above can satisfy the following conditions:

$50 \times 10^{-3} \leq S_1 \leq 60 \times 10^{-3}$ µm²;

$S_{11} \leq 110 \times 10^{-3}$ µm³;

$230 \times 10^{-3} \leq S_2 \leq -145 \times 10^{-3}$ µm²;

$180 \times 10^{-3} \leq S_3 \leq 260 \times 10^{-3}$ µm²; and $20 \times 10^{-3} \leq S_{123} \leq 145 \times 10^{-3}$ µm².

Of course, the present invention is not limited to the examples described and shown, and is open to many variants that will be evident to the skilled person. Thus conditions (1) and (2) above also apply to fibers other than step index and dispersion shifted fibers, which are referred to by way of example above. Values can also be imposed on the parameters $C_{cum}$, $L_g$ and $\Delta\lambda$ other than those given in the examples. In present-day wavelength division multiplex transmission systems, $C_{cum}$ is typically less than 50 ps/nm, but values of the order of 100 ps/nm or 200 ps/nm are still possible. The example of a length $L_g$ of 100 km corresponds to the distance between the repeaters of a prior art terrestrial transmission system; this distance in fact depends on losses in the line fiber, and could increase as line fibers are improved. Finally, the half-bandwidth $\Delta\lambda$ could also be different, if bands are used other than the C and L bands. For example, for transmission in the C and S bands, from 1460 nm to 1530 nm the value of $\Delta\lambda$ would be 35 nm; for transmission in the C, L and S bands, its value would be 80 nm.

What is claimed is:

1. An optical fiber transmission system having a line fiber section and a compensation fiber section for compensating chromatic dispersion in the line fiber section, in which system the chromatic dispersion C and the chromatic dispersion slope C' of the dispersion compensating fiber satisfy the following condition for a wavelength from the range of wavelengths used in the transmission system:

$$\frac{C_g}{C'_g} \times \frac{1}{1 + C_{cum}/(L_g \cdot C'_g \cdot \Delta\lambda)} \leq \frac{C}{C'} \leq \frac{C_g}{C'_g} \times \frac{1}{1 - C_{cum}/(L_g \cdot C'_g \cdot \Delta\lambda)} \quad (1)$$

where $C_g$ is the chromatic dispersion of the line fiber, $C'_g$ is the derivative of the chromatic dispersion of the line fiber with respect to wavelength, $C_{cum}$ is the upper limit of the modulus of the cumulative chromatic dispersion permitted in the line fiber section, and $\Delta\lambda$ is half the width of the range of wavelengths used in the transmission system, and in which system the chromatic dispersion slope C' and the first derivative C" of that slope with respect to wavelength of the dispersion compensating fiber satisfy the following condition for a wavelength substantially in the middle of the range of wavelengths used in the transmission system:

$$\left|\frac{C'}{C''}\right| >= \text{Max}\left(\frac{\Delta\lambda}{2} \times \left(\frac{C \cdot C'_g}{C' \cdot C_g} \times \left(1 \pm \frac{C_{cum}}{L_g \cdot C'_g \cdot \Delta\lambda}\right) - 1\right)^{-1}\right). \quad (2)$$

2. The system of claim 1, in which the constraints (1) and (2) are satisfied for a wavelength substantially in the middle of the range of wavelengths used in the transmission system.

3. The system of claim 1, wherein the difference between said substantially middle wavelength and the middle wavelength of the range of wavelengths used in the transmission system differs by less than 10% from the range of wavelengths used in the transmission system.

4. The system of claim 1, wherein the dispersion compensating fiber has a chromatic dispersion less than −40 ps/(nm.km), or even less than −45 ps/(nm.km), at 1550 nm.

5. The system of claim 1, wherein the dispersion compensating fiber has bending losses less than or equal to 400 dB/m, or even less than or equal to 100 dB/m, when wound around a 10 mm radius former, and throughout the range of wavelengths used in the transmission system.

6. The system of claim 1, wherein the dispersion compensating fiber has bending losses less than or equal to 0.05 dB, or even less than or equal to $10^{-3}$ dB, for 100 turns wound onto a 30 mm radius former, and throughout the range of wavelengths used in the transmission system.

7. The system of claim 1, wherein the dispersion compensating fiber has an effective surface area greater than or equal to 12 μm at 1550 nm.

8. The system of claim 1, wherein the dispersion compensating fiber has a polarization mode dispersion less than or equal to 0.5 ps/km$^{1/2}$ at 1550 nm.

9. The system of claim 1, wherein the dispersion compensating fiber has an attenuation less than 1 dB/km, or even 0.8 dB/km, at 1550 nm.

10. The system of claim 1, wherein the ratio between the upper limit of the modulus of the cumulative chromatic dispersion $C_{cum}$ and the length $L_g$ of a line fiber section is less than 0.5 ps/(nm.km), or even 0.1 ps/(nm.km).

11. The system of claim 1, wherein the line fiber is a step index fiber.

12. The system of claim 1, wherein the line fiber is a dispersion shifted fiber with positive chromatic dispersion.

13. The system of claim 1, wherein the dispersion compensating fiber has a rectangle with buried trench and ring index profile.

14. The system of claim 1, wherein the dispersion compensating fiber has a trapezium with buried trench and ring index profile.

15. An optical fiber having a chromatic dispersion C less than −40 ps/(nm.km), or even less than −45 ps/(nm.km), at 1550 nm, a chromatic dispersion slope C' and a first derivative C'' of chromatic dispersion slope with respect to wavelength satisfying the conditions:

$$a \times \frac{1}{1+b} \leq \frac{C}{C'} \leq a \times \frac{1}{1-b} \quad \text{and}$$

$$\left|\frac{C'}{C''}\right| \geq \text{Max}\left(c \times \left(\frac{C}{C'}\frac{1}{a} \times (1 \pm b) - 1\right)^{-1}\right)$$

for a wavelength in the vicinity of 1570 nm, where a, b and c are parameters satisfying the conditions:
280≦a≦360 nm,
0.2≦b≦0.25, and
c≦25 nm.

16. An optical fiber having a chromatic dispersion C less than −40 ps/(nm.km), or even less than −45 ps/(nm.km), at 1550 nm, a chromatic dispersion slope C' and a first derivative C'' of chromatic dispersion slope with respect to wavelength satisfying the conditions:

$$a \times \frac{1}{1+b} \leq \frac{C}{C'} \leq a \times \frac{1}{1-b} \quad \text{and}$$

$$\left|\frac{C'}{C''}\right| \geq \text{Max}\left(c \times \left(\frac{C}{C'}\frac{1}{a} \times (1 \pm b) - 1\right)^{-1}\right)$$

for a wavelength in the vicinity of 1570 nm, where a, b and c are parameters verifying the conditions:
120≦a≦200 nm,
0.2≦b≦0.25, and
c≦25 nm.

17. The fiber of claim 15, having bending losses less than or equal to 400 dB/m, or even less than or equal to 100 dB/m, when wound around a 10 mm radius former, for wavelengths from 1530 to 1620 nm.

18. The fiber of claim 15, having bending losses less than or equal to 0.05 dB, or even less than or equal to $10^{-3}$ dB, for 100 turns wound onto a 30 mm radius former, for wavelengths from 1530 to 1620 nm.

19. The fiber of claim 15, having an effective section greater than or equal to 12 μm$^2$ at 1550 nm.

20. The fiber of claim 15, having a polarization mode dispersion less than or equal to 0.5 ps/km$^{1/2}$ at 1550 nm.

21. The fiber of claim 15, having an attenuation less than 1 dB/km, or even less than 0.8 dB/km, at 1550 nm.

22. The fiber of claim 15, having a rectangle with buried trench and ring index profile.

23. The fiber of claim 15, having a trapezium with buried trench and ring index profile.

24. The fiber of claim 16, having a rectangle with buried trench and ring index profile.

25. The fiber of claim 16, having a trapezium with buried trench and ring index profile.

26. The fiber of claim 22, wherein the difference between the index of the rectangle or the trapezium and index of the cladding is from $18 \times 10^{-3}$ to $30 \times 10^{-3}$ and wherein the radius of the part of the fiber having an index higher than the cladding is from 1.2 to 2.1 μm.

27. The fiber of claim 22, wherein the difference between the index of the depleted trench and the index of the cladding is from $-8.5 \times 10^{-3}$ to $-4.5 \times 10^{-3}$ and wherein the outside radius of said trench is from 3.4 to 6.1 μm.

28. The fiber of claim 22, wherein the difference between the index of the ring and the index of the cladding is from $1 \times 10^{-3}$ to $15 \times 10^{-3}$ and wherein the outside radius of said ring is from 5.9 to 8 μm.

29. The fiber of claim 22, wherein twice the integral of the product of the radius and the index between a zero radius and the outside radius of the central part of the fiber having an index higher than the cladding is from $48 \times 10^{-3}$ to $65-10^{-3}$ μm$^2$.

30. The fiber of claim 22, wherein three times the integral of the product of the square of the radius and the index between a zero radius and the outside radius of the central part of the fiber having an index higher than the cladding is greater than $110 \times 10^{-3}$ μm$^3$.

31. The fiber of claim 22, wherein twice the integral of the product of the radius and the index between the outside radius of the central part of the fiber having an index higher than the cladding and the inside radius of the ring is from $-155 \times 10^3$ to $-75 \times 10^{-3}$ μm$^2$.

32. The fiber of claim 22, wherein twice the integral of the product of the radius and the index between the inside radius and the outside radius of the ring is from $70\times10^{-3}$ to $210\times10^{-3}$ $\mu m^2$.

33. The fiber of claim 22, wherein twice the integral of the product of the radius and the index between a zero radius and the outside radius of the ring is greater than $20\times10^{-3}$ $\mu m^2$.

34. The fiber of claim 24, wherein the difference between the index of the rectangle or the trapezium and the index of the cladding is from $18\times10^{-3}$ to $30\times10^{-3}$ and wherein the radius of the part of the fiber having an index higher than the cladding is from 1.2 to 1.9 $\mu m$.

35. The fiber of claim 24, wherein the difference between the index of the depleted trench and the index of the cladding is from $-10\times10^{-3}$ to $-5.8\times10^{-3}$ and wherein the outside radius of said trench is from 3.4 to 6.1 $\mu m$.

36. The fiber of claim 24, wherein the difference between the index of the ring and the index of the cladding is from $1\times10^{-3}$ to $17.5\times10^{-3}$ and wherein the outside radius of said ring is from 6.25 to 8.3 $\mu m$.

37. The fiber of claim 24, wherein twice the integral of the product of the radius and the index between a zero radius and the outside radius of the central part of the fiber having an index higher than the cladding is from $50\times10^{-3}$ to $60\times10^{-3}$ $\mu m^2$.

38. The fiber of claim 24, wherein three times the integral of the product of the square of the radius and the index between a zero radius and the outside radius of the central part of the fiber having an index higher than the cladding is less than $110\times10^{-3}$ $\mu m^3$.

39. The fiber of claim 24, wherein twice the integral of the product of the radius and the index between the outside radius of the central part of the fiber having an index higher than the cladding and the inside radius of the ring is from $-230\times10^{-3}$ to $-145\times10^{-3}$ $\mu m^2$.

40. The fiber of claim 24, wherein twice the integral of the product of the radius and the index between the inside radius and the outside radius of the ring is from $-180\times10^{-3}$ to $-260\times10^{-3}$ $\mu m^2$.

41. The fiber of claim 24, wherein twice the integral of the product of the radius and the index between a zero radius and the outside radius of the ring is from $20\times10^{-3}$ $\mu m^2$ to $145\times10^{-3}$ $\mu m^2$.

* * * * *